United States Patent [19]

Imamura

[11] Patent Number: 5,767,476
[45] Date of Patent: Jun. 16, 1998

[54] MANUFACTURING METHOD FOR AUTOMOTIVE FRAME

[75] Inventor: Yoshihaya Imamura, Fujisawa, Japan

[73] Assignee: Kabushiki Kaisha Kobe Seiko Sho. Kobe, Japan

[21] Appl. No.: 652,414

[22] Filed: May 23, 1996

[30] Foreign Application Priority Data

Jun. 7, 1995 [JP] Japan .................. 7-140929

[51] Int. Cl.$^6$ .................. B23K 11/00; B60J 7/00
[52] U.S. Cl. .................. 219/117.1; 296/185
[58] Field of Search .................. 219/56, 57, 58, 219/101, 104, 117.1, 145.1, 146.31, 146.32, 156; 280/781, 785; 296/29, 185, 187, 203

[56] References Cited

U.S. PATENT DOCUMENTS

| | | | |
|---|---|---|---|
| 4,440,434 | 4/1984 | Celli | 296/185 |
| 5,094,313 | 3/1992 | Mauws | 180/210 |
| 5,322,208 | 6/1994 | Hinrichs et al. | 228/182 |
| 5,634,663 | 6/1997 | Krupp et al. | 280/800 |

*Primary Examiner*—Matthew V. Nguyen
*Attorney, Agent, or Firm*—Oblon, Spivak, McClelland, Maier & Neustadt, P.C.

[57] ABSTRACT

An automotive frame is assembled by joining fins of extrusions formed of aluminum alloy by resistance spot welding. The fins are formed integrally with each extrusion by extrusion. Alternatively, the extrusions may be joined together through a node part having fins. In this case, the fins of each extrusion are joined by resistance spot welding to the fins of the node part. The node part includes a body formed by extrusion and a side plate penetration-welded to the body by laser welding. The side plate functions as the fins of the node part.

13 Claims, 9 Drawing Sheets

MANUFACTURING METHOD FOR AUTOMOTIVE FRAME

BACKGROUND OF THE INVENTION

The present invention relates to a manufacturing method for an automotive frame composed generally of rectangular pipelike extrusions formed of aluminum or aluminum alloy (which will be hereinafter generally named as aluminum material), and more particularly to a manufacturing method for an automotive frame which can improve assembly accuracy and productivity.

A space frame structure is generally used to support a body of an automobile, transport plane, etc. by a hollow frame. FIG. 16 is a schematic perspective view showing a space frame structure applied to a general automobile. A node part 5 joins three extrusions of an A-pillar 1a, a roof side rail 2, and an upper A-cross beam 3a at given angles. Each of other node parts 6, 7, and 8 similarly joins three extrusions like the node part 5. Further, a node part 9 joins four extrusions of the A-pillar 1a, an A-pillar 1b, a lower A-cross beam 3b, and a hood ridge 4 at given angles. These two kinds of node parts are typically used for the manufacture of an automotive frame. In this manner, the automotive frame is manufactured by joining at least two extrusions through a node part. Such a node part is manufactured usually by casting.

FIG. 17 is a schematic perspective view showing a method of joining extrusions to a cast node part used as the node part 9 shown in FIG. 16, for example. In general, the cast node part 9 is engaged at one end thereof into the A-pillar 1b which is a hollow member, and they are joined at their overlapped portion by MIG welding or TIG welding. However, the use of such a cast node part or another node part causes an increase in weight of the automotive frame and an increase in manufacturing cost of the automotive frame due to a high manufacturing cost of the cast node part and an increased number of welding positions. To cope with this problem, there has conventionally been proposed a manufacturing method for an automotive frame which does not use any node parts (Japanese Patent Laid-open No. 6-219321).

FIG. 18 is a schematic perspective view showing a method of joining extrusions without the use of any node parts. In this method, an integral bent member 11 corresponding to the assembly of the A-pillar 1a and the hood ridge 4 shown in FIG. 16 is preliminarily manufactured. Further, the other extrusions 1b and 3b are butted on the integral bent member 11, and they are joined together at a portion 12 by MIG welding, TIG welding, high-energy density beam welding, etc. According to this manufacturing method, the extrusions are directly joined together, thereby reducing the number of welding positions and accordingly reducing the manufacturing cost. Furthermore, since no node parts are used, an increase in weight of the automotive frame can be suppressed.

However, since this method employs MIG welding, TIG welding, high-energy welding (e.g., laser welding or beam welding), etc., there is a limit of reduction in manufacturing cost. Further, it is necessary to form butting portions on the extrusions to be butted on each other. Since these butting portions are subjected to high-energy welding, etc., a sufficient assembly accuracy cannot be obtained. To ensure a sufficient assembly accuracy, any jig or high-precision machining is required, causing a difficulty of automated manufacturing. In these circumstances, it is desired to develop a manufacturing method for an automotive frame which is fit for mass production at a low cost.

In manufacturing method of the present invention, aluminum extrusions each having a box-like sectional area is used, for instance, in respect to a car frame which is conventionally assembled by steel plates through spot welding. A spot welding process during assembling stage can thus be omitted. Producibility is remarkably improved, while reducing weight of the car.

SUMMARY OF THE INVENTION

It is accordingly an object of the present invention to provide a manufacturing method for an automotive frame which can improve productivity, be fit for mass production, and reduce a manufacturing cost.

According to an aspect of the present invention, there is provided a manufacturing method for an automotive frame, comprising the steps of preparing at least two extrusions each having a fin, formed of aluminum or aluminum alloy; laping the extrusions so that the fins of the extrusions come into contact with each other; and joining the fins kept in contact with each other by resistance spot welding to thereby join the extrusions together.

According to another aspect of the present invention, there is provided a manufacturing method for an automotive frame, comprising the steps of preparing at least two extrusions each having a fin, formed of aluminum or aluminum alloy; preparing a node part having a fin, formed of aluminum or aluminum alloy; locating the node part between the extrusions so that the fin of the node part comes into contact with the fin of each of the extrusions; and joining the fins kept in contact with each other by resistance spot welding to thereby join the extrusions to the node part.

In the method of the present invention, the extrusions can be joined together by resistance spot welding rather than MIG welding, TIG welding, high-energy density beam welding, etc. That is, the fin is preliminarily formed on each extrusion in forming the extrusion by extrusion or the like. Then, the extrusions are joined together at their fins by resistance spot welding, thus reducing the manufacturing cost. In the case of using the node part, the fin is also preliminarily provided on the node part. Then, the extrusions and the node part are joined together at their fins by resistance spot welding. Thus, according to the present invention, the productivity in manufacturing the automotive frame can be improved and the manufacturing cost can also be reduced.

DETAILED DESCRIPTION OF THE PREFERRED EMBODIMENTS

Some preferred embodiments of the present invention will now be described with reference to the attached drawings.

Figure 1:
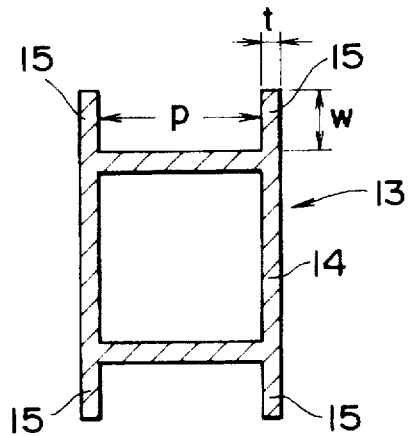
FIG. 1 is a sectional view of an extrusion according to a preferred embodiment of the present invention.

FIG. 1 is a sectional view of an extrusion 13 used in a preferred embodiment of the present invention. The extrusion 13 has a rectangular pipelike body 14 and four fins 15 for spot welding, which extend outward from the body 14. The number of the fins 15 is set to preferably at least two in the present invention, so as to ensure a strength of joining between the extrusion 13 and another similar extrusion. While the body 14 is formed like a rectangular pipe in this preferred embodiment, it may be formed like a reinforced rectangular pipe with one or more internal reinforcing members. Each fin 15 for spot welding (for joining) has a thickness t set to preferably about 1 to about 4 mm in consideration of a strength of spot welding and a technical limitation in extrusion for obtaining the extrusion 13, and has a width w set to essentially 2/3 or more times the diameter of each electrode used in spot welding. Further, a distance p between the opposed fins 15 must be set to a value allowing insertion of a welding gun between the opposed fins 15.

Figure 2:
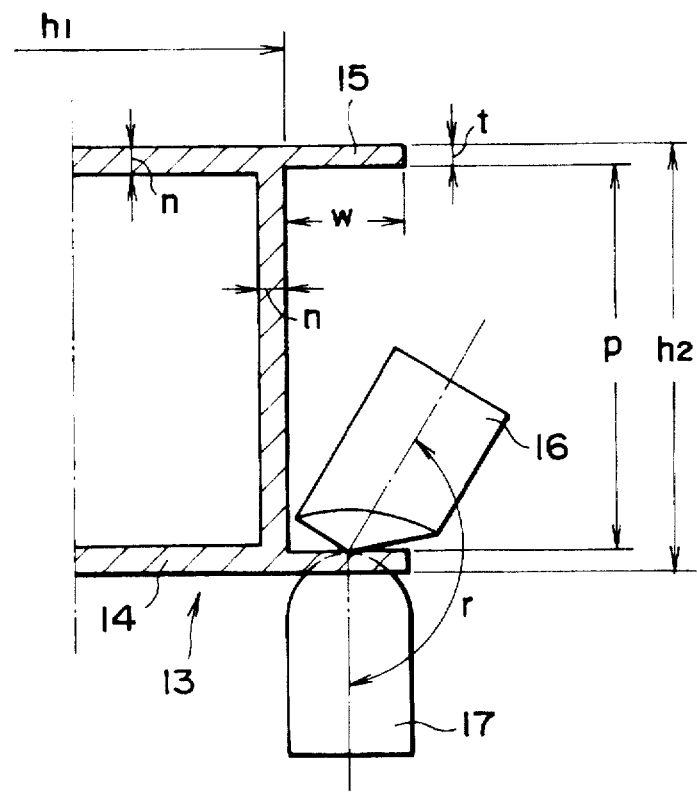
FIG. 2 is an enlarged view of a part of the extrusion shown in FIG. 1.

FIG. 2 is an enlarged view of a part of the extrusion 13 shown in FIG. 1. For example, the thickness t of each fin 15 is set to 2 mm, and two electrodes each having a diameter of 16 mm are used. In this case, the width w of each fin 15 is set to 15 mm, and a welding gun with an angle r between the upper and lower electrodes set to 150° is used. The fins 15 of the extrusion 13 and the fins of another extrusion are joined together by resistance spot welding by using an upper electrode tip 16 and a lower electrode tip 17. The sectional shape of the rectangular pipelike body 14 is square, for example, and the length $h_1$ of each side thereof is set to 50 mm, for example. In this case, the distance p between the opposed fins 15 becomes 46 mm. Further, the wall thickness n of the square pipelike body 14 is set to 3 mm, for example.

Figure 3:
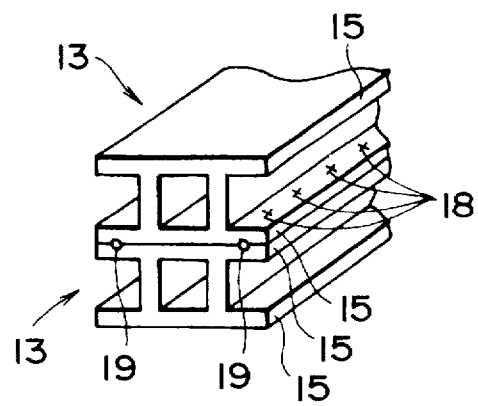
FIG. 3 is a schematic perspective view of two straight extrusions joined together by spot welding.

As shown in FIG. 3, the extrusion 13 and another similar extrusion 13 are stacked in parallel to each other, and they are spot-welded at at least two points 18 on the fins 15 adjacent to each other. Thus, the extrusions 13 are joined together by nuggets 19 obtained.

Figure 4:
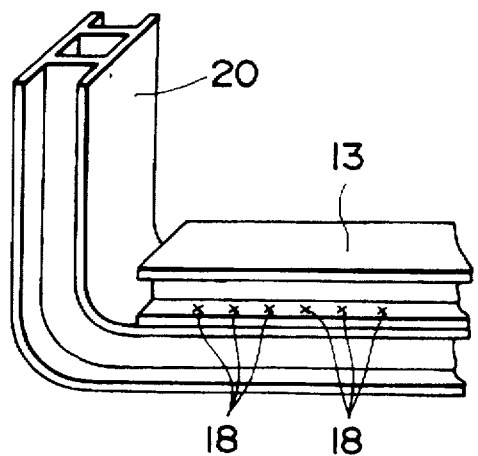
FIG. 4 is a schematic perspective view of a bent extrusion and a straight extrusion joined together by spot welding.

Such a method of joining the extrusions 13 together through their fins 15 may be applied to an embodiment shown in FIG. 4. In the embodiment shown in FIG. 4, the straight extrusion 13 is stacked on a straight portion of a bent extrusion 20 with their fins facing each other, and the two extrusions 13 and 20 are spot-welded together at at least two points 18 on the adjacent fins. Thus, the present invention is widely applicable to various extrusions.

Figure 5:
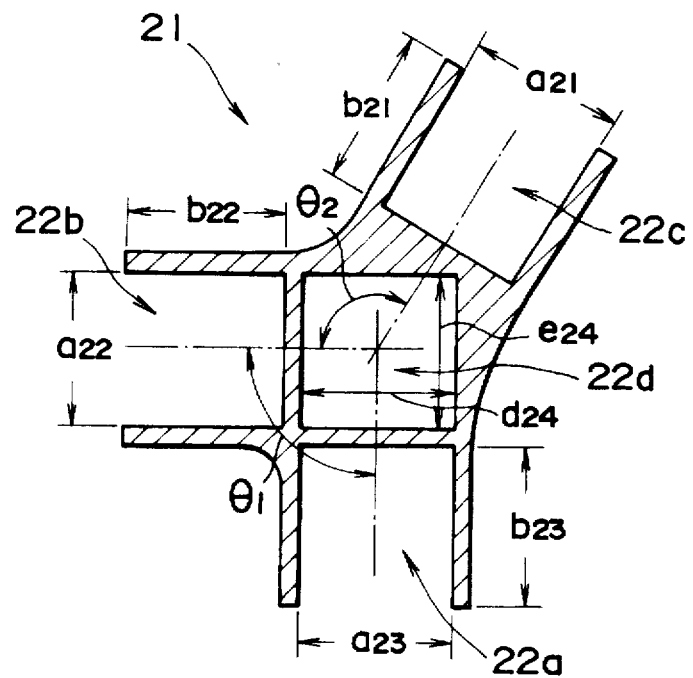
FIG. 5 is a sectional view of a body of a node part according to another preferred embodiment of the present invention.
Figure 6:
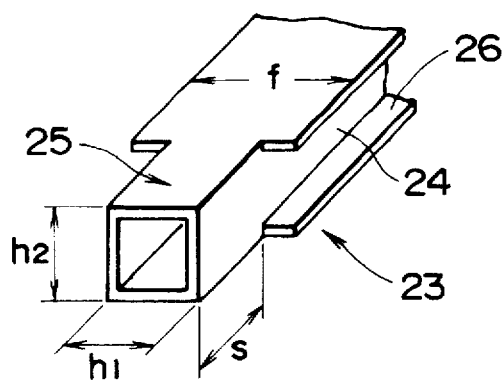
FIG. 6 is a schematic perspective view of an extrusion adapted to be engaged into the body shown in FIG. 5.
Figure 16:
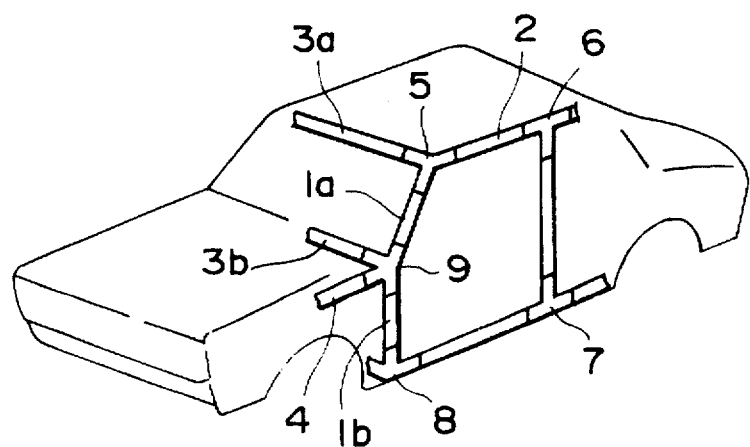
FIG. 16 is a schematic perspective view showing a space frame structure applied to a general automobile.

FIG. 5 is a cross section of a joining body 21 of a node part to be hereinafter described, which is used in another preferred embodiment of the present invention. The joining body 21 is prepared by extrusion. FIG. 6 is a perspective view of an extrusion 23 to be joined to another similar extrusion through the joining body 21. As shown in FIG. 6, the extrusion 23 has a rectangular pipelike body 24 and four fins 26 for spot welding, which extend outward of the body 24 except its end portion 25 (having a length s). The rectangular body 24 has a width $h_1$ and a height $h_2$ as viewed in cross section. The end portion 25 is adapted to be engaged into a hollow 22a (see FIG. 5), for example, formed in the joining body 21. As shown in FIG. 5, the joining body 21 has three hollows 22a, 22b, and 22c each for receiving the end portion 25 of the extrusion 23. The hollows 22a, 22b, and 22c extend radially to open outward, and they are inclined to each other at angles corresponding to desired joining angles between the extrusions 23. The desired joining angles may be arbitrarily set at the time of designing of a die for extruding the joining body 21. In this preferred embodiment, the shape of the joining body 21 is similar to that of the node part 9 for joining four extrusions as shown in FIG. 16, which is supposed to include the node parts 5, 6, 7, and 8. In the preferred embodiment shown in FIG. 5, the angle $\theta_1$ between the hollow 22a and the hollow 22b is set to 90°, for example, and the angle $\theta_2$ between the hollow 22b and the hollow 22c is set to 120°, for example. The distance $a_{23}$ between opposed fins 21a forming the hollow 22a corresponds to the length h1 of one side of the end portion 25 of the rectangular pipelike extrusion 23 shown in FIG. 6, and the width $b_{23}$ of each fin 21a corresponds to the length s of the end portion 25. The other hollows 22b and 22c are formed by opposed fins 21b and opposed fins 21c, respectively, and have substantially the same shape and dimensions as those of the hollow 22a.

As shown in FIG. 5, the joining body 21 further has a rectangular through-hole 22d formed at the center among the hollows 22a, 22b, and 22c, so as to receive the end portion 25 of the extrusion 23 at right angles to the hollows 22a, 22b, and 22c. The horizontal dimension $d_{24}$ of the rectangular through-hole 22d corresponds to the horizontal dimension $h_1$ of the extrusion 23, and the vertical dimension $e_{24}$ of the rectangular through-hole 22d corresponds to the vertical dimension $h_2$ of the extrusion 23. For example, these dimensions are set as $a_{21}=a_{22}=a_{23}=d_{24}=50$ mm, and $b_{21}=b_{22}=b_{23}=e_{24}=50$ mm. Since the end portion 25 of the extrusion 23 is engaged into each of the hollows 22a, 22b, and 22c and the through-hole 22d, the dimensional tolerance therebetween must be set to a value permitting a clearance fit.

Figure 7:
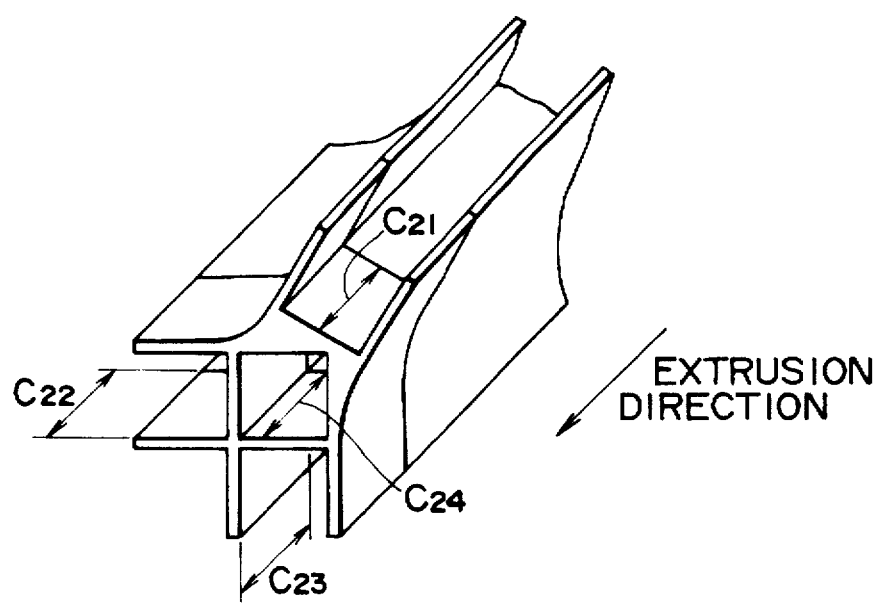
FIG. 7 is a schematic perspective view showing a method of forming the body shown in FIG. 5 by extrusion.

As shown in FIG. 7, the joining body 21 may be manufactured by cutting an extruded stock into pieces with given dimensions $c_{21}$, $c_{22}$, $c_{23}$, and $c_{24}$. The given dimensions $c_{21}$, $c_{22}$, and $c_{23}$ correspond to the dimensions $h_2$ of the end portions 25 of the extrusions 23 for the hollowes 22a, 22b, and 22c, and the given dimension $c_{24}$ corresponds to the dimension s of the end portion 25 of the extrusion 23 for the through-hole 22d. As apparent from the above description, all the dimensions $c_{21}$, $c_{22}$, $c_{23}$, and $c_{24}$ must be equal to each other. Thus, at least two joining bodies can be obtained by only cutting a single extruded stock, thereby efficiently allowing mass production of joining bodies.

Figure 8:
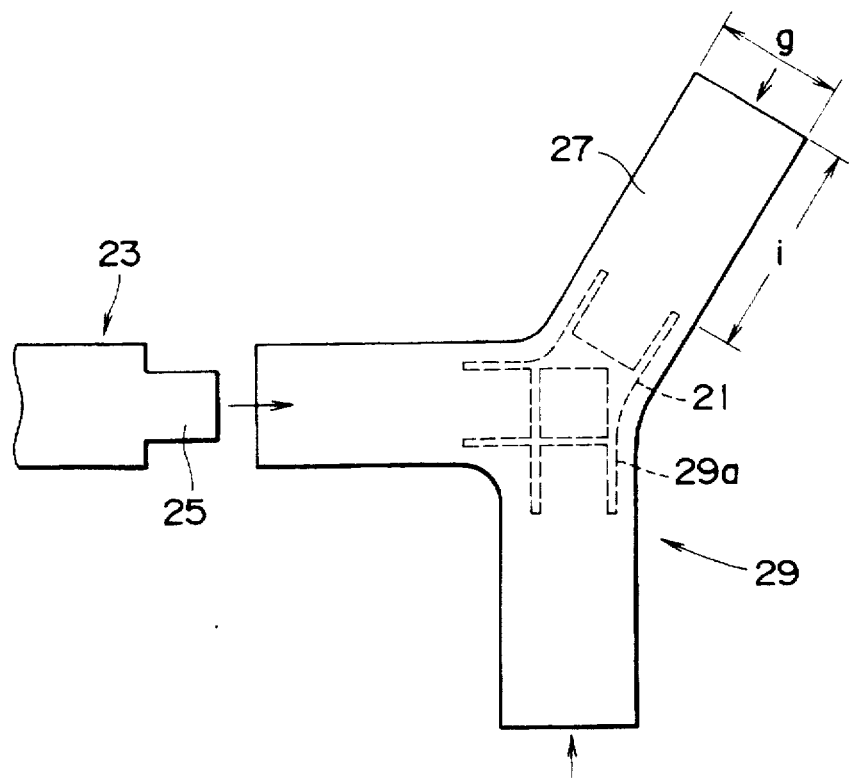
FIG. 8 is a schematic side view of a side plate penetration-welded to the body shown in FIG. 5.
Figure 9:
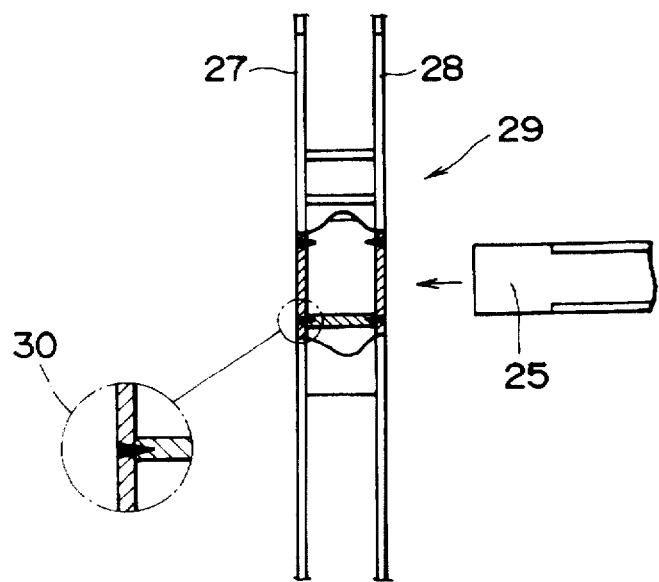
FIG. 9 is a partially sectional, elevational view of the node part.

As shown in FIG. 8, a Y-shaped side plate 27 obtained by stamping or the like is put on one side surface of the joining body 21, and is next penetration-welded to the joining body 21 by laser welding over the side surface of the joining body 21. Accordingly, a bead 29a corresponding to the shape of the joining body 21 is formed in the side plate 27. More specifically, as shown in an encircled portion 30 in FIG. 9, showing a cross section of a laser welded portion, the side plate 27 is penetration-molten to be welded to the joining body 21. Another side plate 28 similar to the side plate 27 is also welded to the other side surface of the joining body 21. However, the side plate 28 must be preliminarily formed with a through-hole having the same size as that of the through-hole 22d of the joining body 21 shown in FIG. 5, so as to allow insertion of the end portion 25 of the extrusion 23 into the through-hole 22d. In this manner, a node part 29 composed of the joining body 21, the side plate 27, and the side plate 28 is completed.

Referring to FIG. 8, the width g of each end portion of the side plate 27 is set equal to the width f of the extrusion 23 including the opposite fins 26 shown in FIG. 6, so as to make the side plate 27 function as fins for spot welding. Further, the length i of each fin portion of the side plate 27 is set according to the number and the pitch of welding spots. For example, in the case that the number of welding spots is 5 and the pitch of welding spots is 30 mm with a length of 15 mm being left at each opposite end, the length i is set to 150 mm. The width of the side plate 28 and the length of its fin portion are also set similar to those of the side plate 27. Further, the thickness of each side plate is set similar to that of each fin 26, for example, set to 2 mm.

As shown in FIG. 8, the end portions 25 of the extrusions 23 each having the fins 26 are inserted into the node part 29 in different directions as depicted by arrows. Then, the fins 26 of the extrusions 23 and the fins of the side plates 27 and 28 are welded together by resistance spot welding, thus joining the extrusions 23 and the node part 29.

Figure 10:
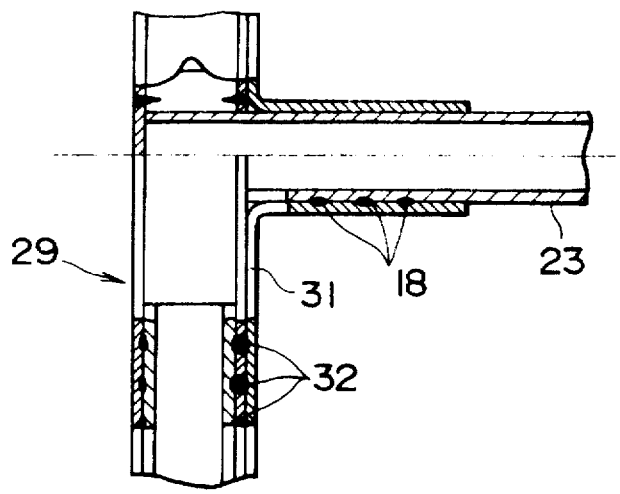
FIG. 10 is a sectional view showing a condition where the node part and extrusions are joined together by L-shaped reinforcing members.
Figure 17:
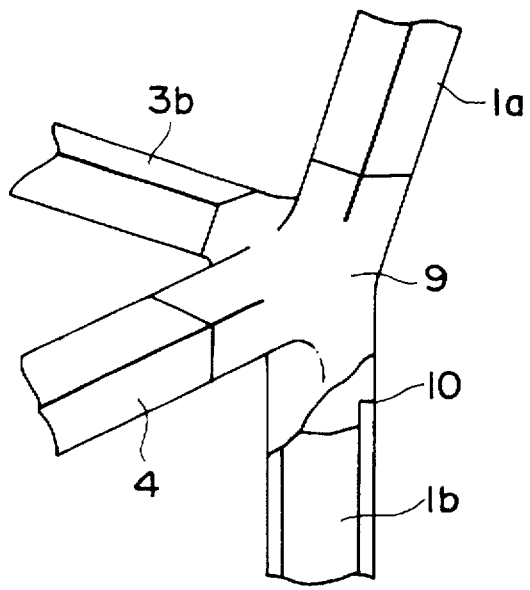
FIG. 17 is a schematic perspective view showing a conventional method of joining extrusions by using a cast node part.
Figure 18:
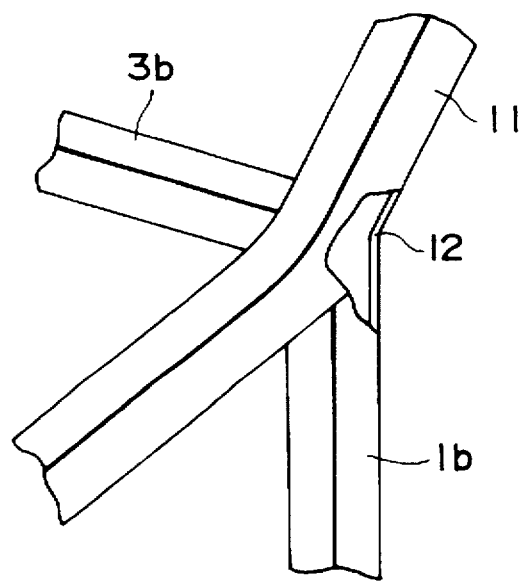
FIG. 18 is a schematic perspective view showing another conventional method of joining extrusions without the use of any node part.

Further, as shown in FIG. 9, the end portion 25 of the extrusion 23 is inserted into the central through-hole 22d of the joining body 21 through the opening of the side plate 28 in a direction perpendicular to the side plate 28. This structure corresponds to that shown in FIG. 17 where the lower A-cross beam 3b is joined to the node part 9 in perpendicular relationship to the other beams 1a, 1b, and 4. In this case, as shown in FIG. 10, the extrusion 23 inserted into the central through-hole 22d of the joining body 21 is joined through L-shaped reinforcing members 31 to the node part 29 and the other extrusions 23 by spot welding only. While each spot-welded portion 32 joins the three plates in this case, this joining can be easily performed by a single step of spot welding.

Figure 11:
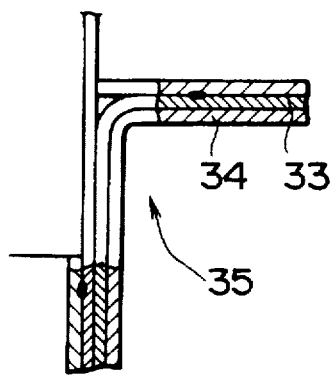
FIG. 11 is a sectional view showing a condition where the node part and extrusions are joined together by using clad members as the L-shaped reinforcing members.

FIG. 11 shows a modification of FIG. 10, which is intended to enhance the function of each L-shaped reinforcing member 31. That is, a clad member 35 consisting of an aluminum member 33 and a steel member 35 is used instead of each L-shaped reinforcing member 31 shown in FIG. 10. In this case, the clad member 35 is spot-welded to the node part and each extrusion in such a manner that the aluminum member 33 is in contact with the node part and each extrusion, thereby further improving the rigidity of the joined portion.

Figure 12:
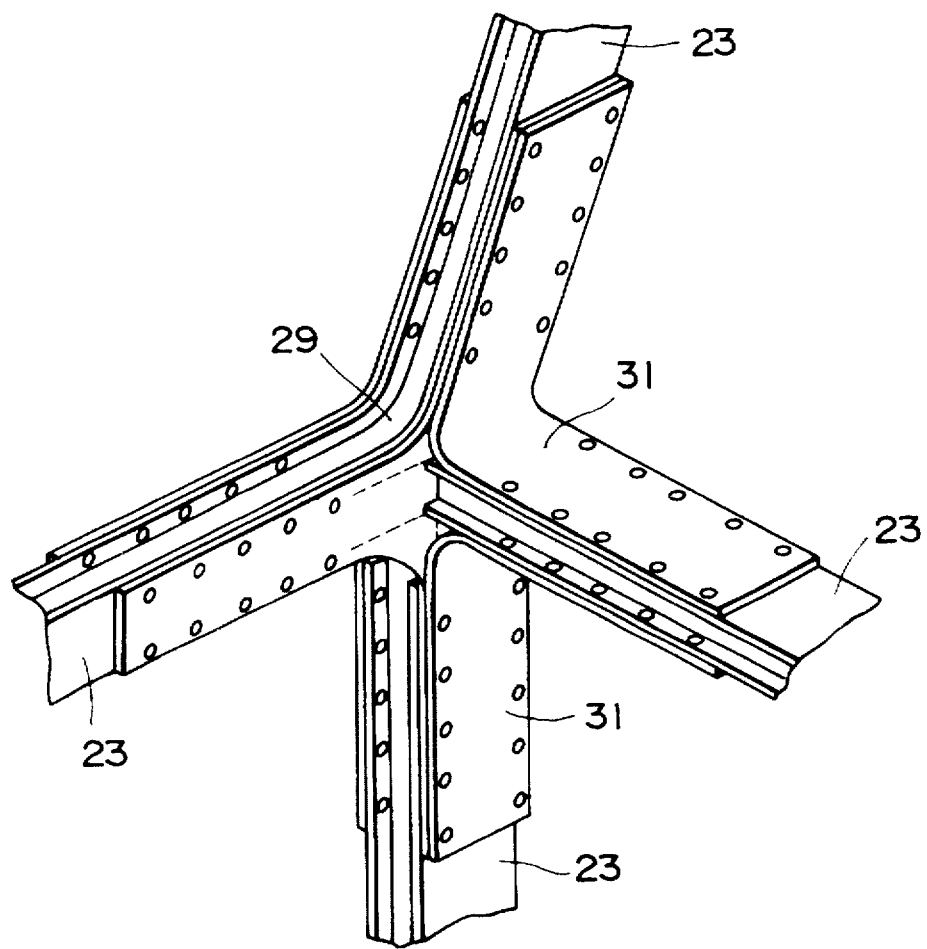
FIG. 12 is a schematic perspective view showing a condition where the extrusions are joined together through the node part and the L-shaped reinforcing members.

FIG. 12 shows a final structure obtained by joining the four extrusions 23 together through the node part 29 and the L-shaped reinforcing members 31. As the material of the joining body 21 and the extrusions 23, A6N01-T5 may be used, for example. As the material of the side plates 27 and 28 and the L-shaped reinforcing members 31, A5182-O may be used, for example.

In the case of preparing the node parts 5 to 9 of the space frame shown in FIG. 16 by applying the present invention, all parts of a vehicle frame can be joined together by spot welding, thus improving the productivity. Further, since arc welding is not adopted at all, possible welding deformation upon assembly can be completely eliminated to thereby realize a high accuracy of assembly.

Figure 13A:
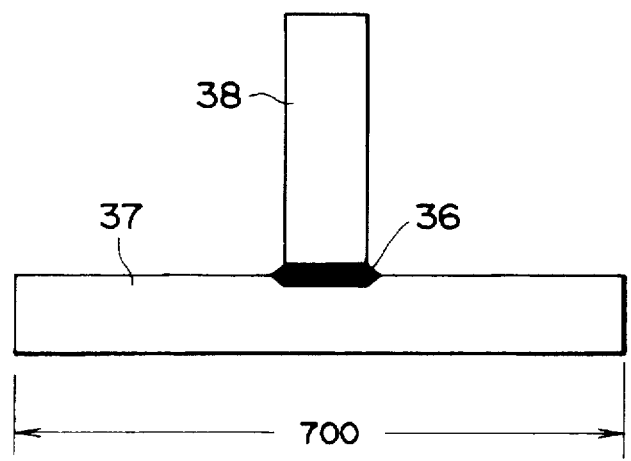
FIGS. 13A and 13B are a side view and an elevational view, respectively, showing a conventional joined frame obtained by using peripheral arc welding.
Figure 13B:
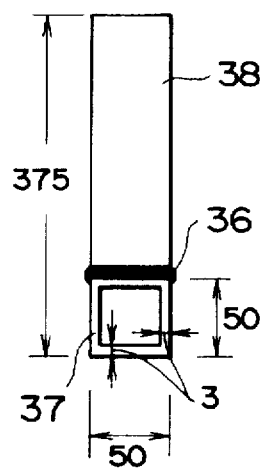

The present inventor made a comparative test of rotational rigidity by using test pieces for Comparison and Preferred Embodiment. The test piece for Comparison is shown in FIGS. 13A and 13B. This test piece is a joined frame prepared by peripherally arc-welding a hollow rectangular bar 38 to a hollow rectangular bar 37 at its longitudinally central portion in perpendicular relationship to each other. The dimensions of the rectangular bar 37 are 50 mm in length of each side in cross section, 700 mm in length, and 3 mm in wall thickness. The dimensions of the rectangular bar 38 are the same as those of the rectangular bar 37 except that its length is 325 mm.

Figure 14A:
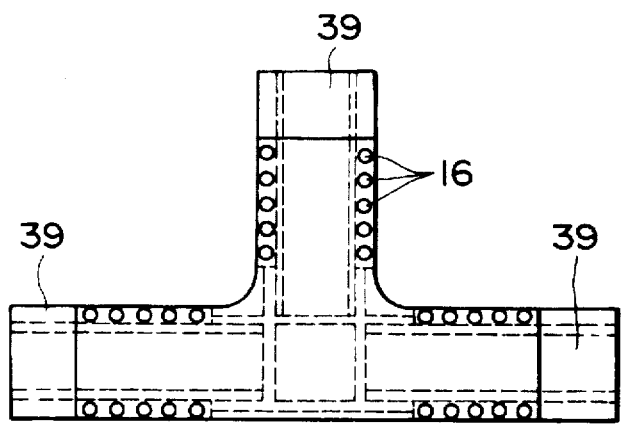
FIGS. 14A and 14B are a side view and an elevational view, respectively, showing a joined frame obtained by using the method according to the present invention.
Figure 14B:
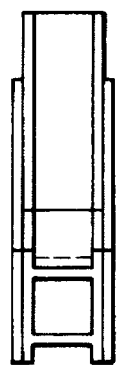

On the other hand, the test piece for Preferred Embodiment is shown in FIGS. 14A and 14B. This test piece is a joined frame prepared by spot-welding at points 40 three extrusions 39 together through a node part 41 according to the present invention with the angle between the neighboring hollows as shown in FIG. 5 being set to $\theta_1=\theta_2=90°$. The length of each extrusion 39 was set to 325 mm.

Figure 15:
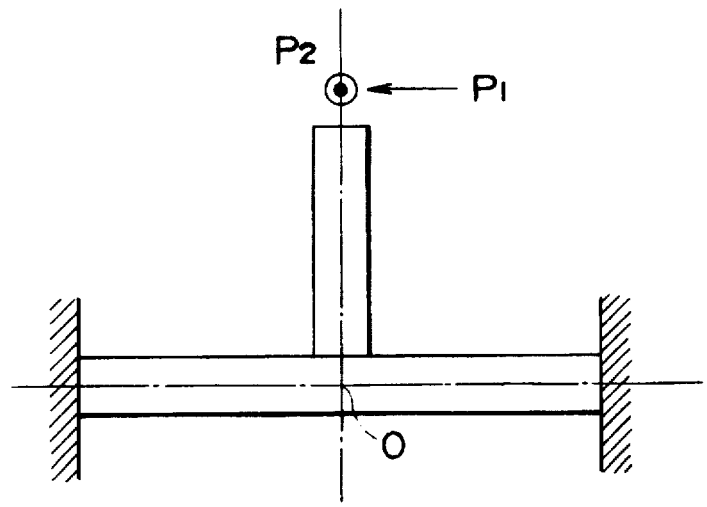
FIG. 15 is a schematic side view showing a test method for rotational rigidity applied to the joined frames shown in FIGS. 13A to 14B.

A test method for the rotational rigidity will now be described for the test piece for Comparison, for example. As shown in FIG. 15, the rectangular bar 37 was fixed at its opposite ends, and a load P1 was applied to a head portion of the rectangular bar 38 in a longitudinal direction of the rectangular bar 37, that is, in this direction in the plane of the sheet of FIG. 15. Alternatively, a load P2 was applied to the head portion of the rectangular bar 38 in a direction perpendicular to both the rectangular bars 37 and 38, that is, in this direction out of the plane of the sheet of FIG. 15. In each case, an angle of deformation of the rectangular bar 38 about a point O was measured to evaluate the rotational rigidity of the test piece for Comparison. The rotational rigidity of the test piece for Preferred Embodiment was also evaluated in a similar manner. The test results of the rotational rigidity obtained by the above method are shown in Table.

As apparent from Table, the rotational rigidity of the joined frame in Preferred Embodiment is 1.5 times that in Comparison both for the in-plane load and for the out-of-plane load. This result is

TABLE

|  | Rotational Rigidity (Kgfm/rad) | |
| --- | --- | --- |
| Load | Comparison (FIGS. 13A and 13B) | Preferred Embodiment (FIGS. 14A and 14B) |
| In-Plane (P1) | 6.0 | 9.0 |
| Out-Of-Plane (P2) | 2.0 | 3.0 | considered to be due to the structure that the fins for spot welding serve as reinforcing ribs.

As described above, according to the method of the present invention, lightweight aluminum or aluminum alloy frame members can be joined together only by spot welding that is high in operation efficiency, and a high strength of joined portions can be obtained. Further, the present invention allows manufacture of all types of lightweight frame mounting structure including an automotive frame applicable to a chassis of an automobile, a cabin of any kind of transport means such as a railway vehicle, airplane, and cable car, etc.

What is claimed is:

1. A manufacturing method for an automotive frame, comprising the steps of:

preparing at least two extrusions each having a fin, formed of aluminum or aluminum alloy;

laping said extrusions so that said fins of said extrusions come into contact with each other; and joining said fins kept in contact with each other by resistance spot welding to thereby join said extrusions together.

2. A manufacturing method for an automotive frame according to claim 1, wherein said fin is formed integrally with each of said extrusions by extrusion.

3. A manufacturing method for an automotive frame according to claim 1, wherein said fin of each of said extrusions comprises at least two fins.

4. A manufacturing method for an automotive frame according to claim 2, wherein said fin of each of said extrusions comprises at least two fins.

5. A manufacturing method for an automotive frame, comprising the steps of:

preparing at least two extrusions each having a fin, formed of aluminum or aluminum alloy;

preparing a node part having a fin, formed of aluminum or aluminum alloy;

locating said node part between said extrusions so that said fin of said node part comes into contact with said fin of each of said extrusions; and joining said fins kept in contact with each other by resistance spot welding to thereby join said extrusions to said node part.

6. A manufacturing method for an automotive frame according to claim 5, wherein said node part comprises a body formed by extrusion and a side plate penetration-welded to said body by laser welding, said side plate serving as said fin of said node part.

7. A manufacturing method for an automotive frame according to claim 5, wherein said node part has at least two hollows inclined to each other at given angles, and the angle formed between neighboring ones of said hollows corresponds to an angle to be formed between neighboring ones of said extrusions.

8. A manufacturing method for an automotive frame according to claim 6, wherein said node part has at least two hollows inclined to each other at given angles, and the angle formed between neighboring ones of said hollows corresponds to an angle to be formed between neighboring ones of said extrusions.

9. A manufacturing method for an automotive frame according to claim 5, wherein said fin of each of said extrusions comprises at least two fins, and said fin of said node part comprises at least two fins.

10. A manufacturing method for an automotive frame according to claim 6, wherein said fin of each of said extrusions comprises at least two fins, and said fin of said node part comprises at least two fins.

11. A manufacturing method for an automotive frame according to claim 7, wherein said fin of each of said extrusions comprises at least two fins, and said fin of said node part comprises at least two fins.

12. A manufacturing method for an automotive frame according to claim 8, wherein said fin of each of said extrusions comprises at least two fins, and said fin of said node part comprises at least two fins.

13. A manufacturing method for an automotive frame, comprising the steps of:

preparing at least two extrusions each having a fin, formed of aluminum or aluminum alloy;

preparing a node part having a fin and at least two hollows, formed of aluminum or aluminum alloy;

connecting said extrusions into said hollows of said node part so that said fin of said node part comes into contact with said fin of each of said extrusions; and joining said fins kept in contact with each other by resistance spot welding to thereby join said extrusions together through said node part.

* * * * *